(12) United States Patent
Lee

(10) Patent No.: US 6,570,279 B2
(45) Date of Patent: May 27, 2003

(54) HEAT SINK PLATE OF ALTERNATOR FOR VEHICLE

(75) Inventor: Hyun-Ceol Lee, Taegu (KR)

(73) Assignee: Valeo Mando Electrical System Korea Limited, Kyongsangbuk-do (KR)

( * ) Notice: Subject to any disclaimer, the term of this patent is extended or adjusted under 35 U.S.C. 154(b) by 0 days.

(21) Appl. No.: 09/867,999

(22) Filed: May 18, 2001

(65) Prior Publication Data

US 2002/0024263 A1 Feb. 28, 2002

(30) Foreign Application Priority Data

Aug. 31, 2000 (KR) ........................................ 2000-50970

(51) Int. Cl.$^7$ ............................................... H02K 11/00
(52) U.S. Cl. ...................... 310/68 D; 363/144; 363/145
(58) Field of Search .................. 310/68 D, 91, 310/64; 363/144–145; 361/697, 707

(56) References Cited

U.S. PATENT DOCUMENTS

| | | | | |
|---|---|---|---|---|
| 4,952,829 A | * | 8/1990 | Armbruster et al. | 310/68 D |
| 5,296,770 A | * | 3/1994 | Pflueger et al. | 310/68 D |
| 6,252,320 B1 | * | 6/2001 | Ballard et al. | 310/68 D |
| 6,307,289 B1 | * | 10/2001 | Skala | 310/68 D |

FOREIGN PATENT DOCUMENTS

JP 02002034220 * 1/2002 ............... 310/68 D

* cited by examiner

Primary Examiner—Tran Nguyen
(74) Attorney, Agent, or Firm—R. Neil Sudol; Henry D. Coleman; William J. Sapone

(57) ABSTRACT

The present invention relates to a heat sink plate of an alternator for a vehicle which is capable of implementing an inherent operation of a heat sink by forming a hole in a plate and inserting a diode, forming a protrusion for stably fixing to a rear bracket for thereby implementing an inherent operation of a heat sink, enhancing a performance of a fan, simplifying an assembling work and implementing a stable installation of a regulator and other elements. In the heat sink plate of an alternator for a vehicle, the heat sink includes a circular plate formed based on a die casting method, a hole is formed at a certain portion of the circular plate, and a protrusion is inserted into a heat sink protrusion mounting groove which communicates with a circular plate mounting portion of a rear bracket in a certain circumferential surface of the circular plate and is engaged with a rear bracket in a heat sink of an alternator for a vehicle which includes a diode for changing an alternating current to a direct current for thereby radiating a heat.

2 Claims, 6 Drawing Sheets

PRIOR ART

HEAT SINK PLATE OF ALTERNATOR FOR VEHICLE

BACKGROUND OF THE INVENTION

1. Field of the Invention

The present invention relates to a heat sink plate of an alternator for a vehicle, and in particular to a heat sink plate of an alternator for a vehicle which is capable of enhancing a performance of a fan and simplifying an assembling work and implementing a stable installation of a regulator.

2. Description of the Background Art

Generally, an alternator represents a synchronous alternator capable of generating an alternating current power in which an electromotive force of an alternating current is generated in a conductive member by rotating a magnetic pole in a fixed conductive member(coil). At this time, the equation of f(p*n/120) is obtained assuming that a frequency is f(Hz), a magnetic pole rotation speed is n(rpm), and the number of magnetic poles is p.

In addition, an electromotive force is proportional to a square of the number of magnetic force lines formed by a magnetic pole and a rotation speed. The alternator is driven so that the rotation becomes constant for implementing a certain frequency.

Therefore, in order to change the size of the electromotive force, the current of the exciting coil wound on the magnetic pole is adjusted, and there are a single phase and three phases. Three phases are generally used, and single phase is rarely used.

A motor is classified into a waterwheel type motor, a turbine motor driven by a steam turbine or gas turbine, and an engine motor driven by a combustion engine.

As a current of a battery is flown to a coil from a F terminal of a motor through an IG and F terminal of a voltage regulator when an ignition switch is closed, the motor generates a magnetic field in a rotor.

When the engine is driven and the rotor is rotated, a power is generated in a stator coil in a three phase state.

The thusly generated three phase alternating current is rectified by a diode and is flown to a B terminal. If the voltage of the B terminal is higher than the voltage of the battery, the battery is charged, and the current is supplied to each load.

If the rotation speed of the generator is gradually increased, and the voltage of the B terminal is increased to a set level, the voltage regulator is driven for thereby decreasing the current flown to the rotor coil. Therefore, the operation of the alternator is controlled, and the voltage of the B terminal is maintained at a certain set value.

When the engine is stopped, the current may be reversely flown from the battery to the alternator. In this case, the diode prevents the reverse flown of the current.

Therefore, the voltage of the alternator is maintained at a certain set value and is supplied to the battery or each electrical device.

As shown in FIGS. 6 and 7, six or eight diodes 10 capable of changing the alternating current into the direct current are attached to a heat sink 20 installed in the interior of a housing H by two types of (+) and (−) for thereby radiating heat generated during the rectifying operation.

In the conventional heat sink plate of an alternator for a vehicle, two heat sinks are separately fabricated, and the cooling performance of the fan is bad.

SUMMARY OF THE INVENTION

Accordingly, it is an object of the present invention to provide a heat sink plate of an alternator for a vehicle which overcomes the problems encountered in the conventional art.

It is another object of the present invention to provide a heat sink plate of an alternator for a vehicle which is capable of implementing an inherent operation of a heat sink by forming a hole in a plate and inserting a diode, forming a protrusion for stably fixing to a rear bracket for thereby implementing an inherent operation of a heat sink, enhancing a performance of a fan, simplifying an assembling work and implementing a stable installation of a regulator and other elements.

To achieve the above objects, there is provided a heat sink plate of an alternator for a vehicle in which the heat sink includes a circular plate formed based on a die casting method, a hole is formed at a certain portion of the circular plate, and a protrusion is inserted into a heat sink protrusion mounting groove which communicates with a circular plate mounting portion of a rear bracket in a certain circumferential surface of the circular plate and is engaged with a rear bracket in a heat sink of an alternator for a vehicle which includes a diode for changing an alternating current to a direct current for thereby radiating a heat, a heat sink plate of an alternator for a vehicle.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The embodiments of the present invention will be explained with reference to the accompanying drawings.

Figure 1:
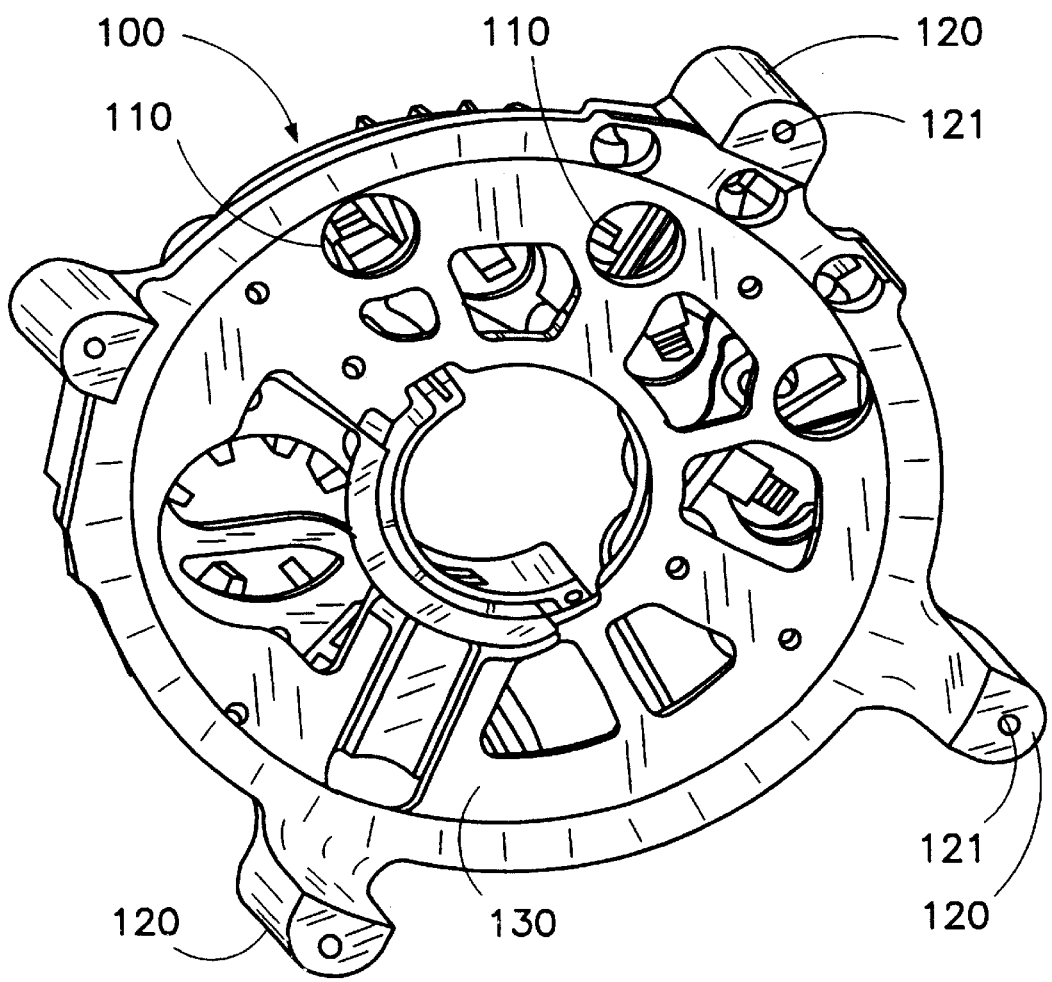
FIG. 1 is a perspective view illustrating a heat sink plate of an alternator for a vehicle according to the present invention.
Figure 2:
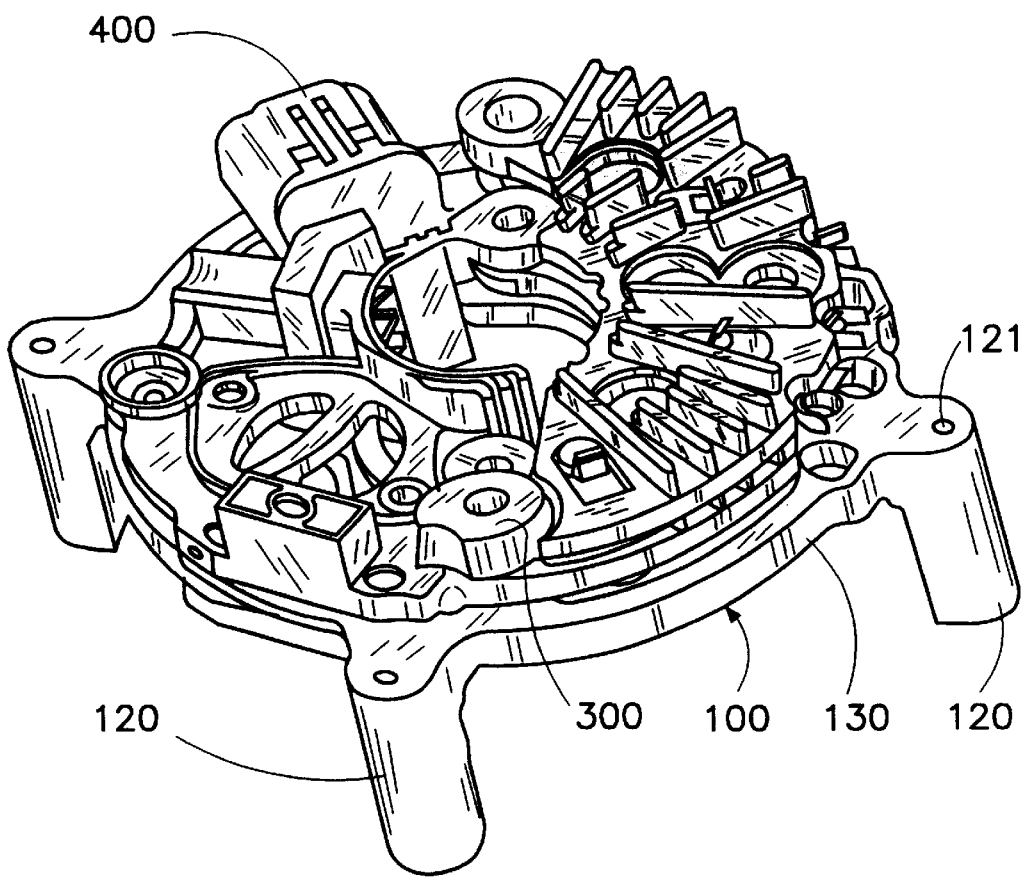
FIG. 2 is a perspective view illustrating a state that an electrical device such as a regulator is installed in a heat sink plate according to the present invention.
Figure 3:
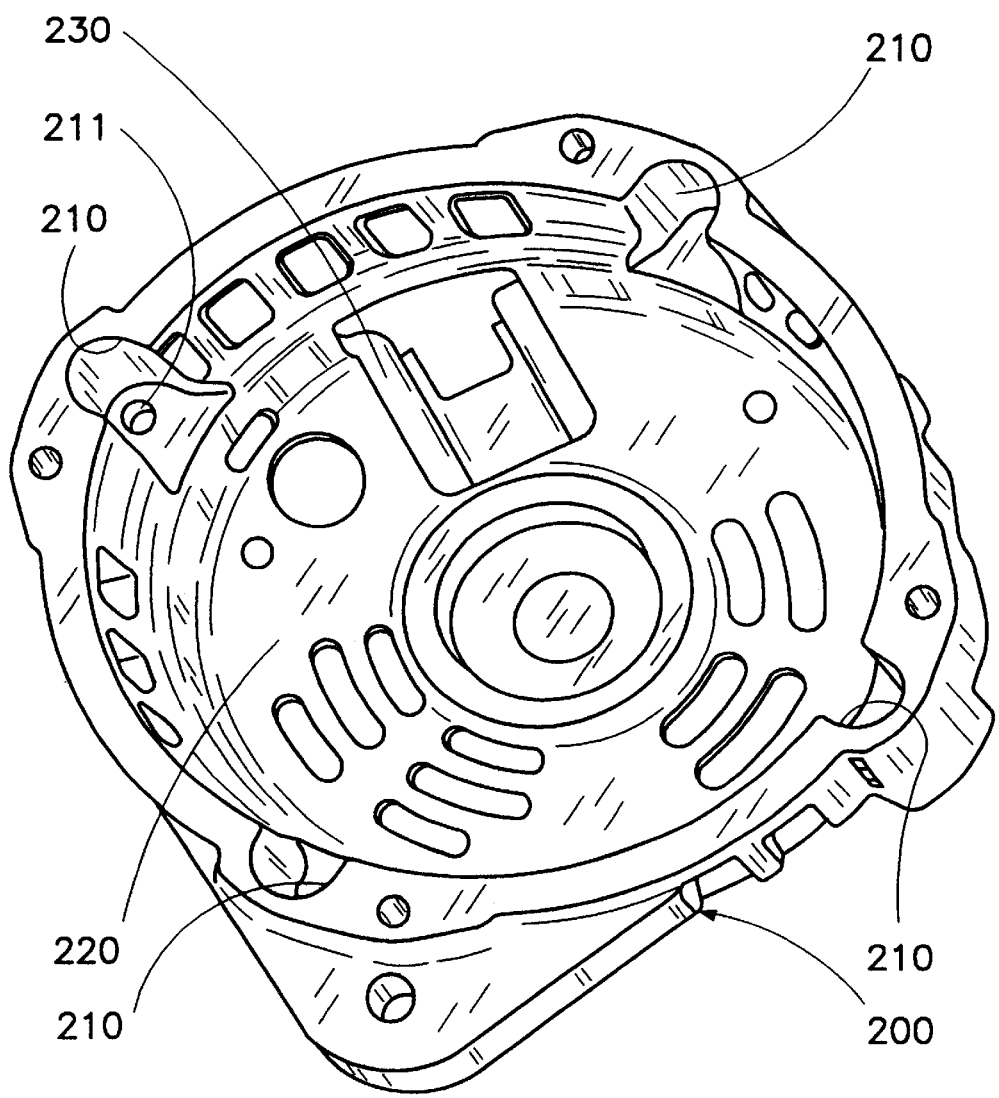
FIG. 3 is a perspective view illustrating a rear bracket in which a heat sink plate is installed according to the present invention.
Figure 4:
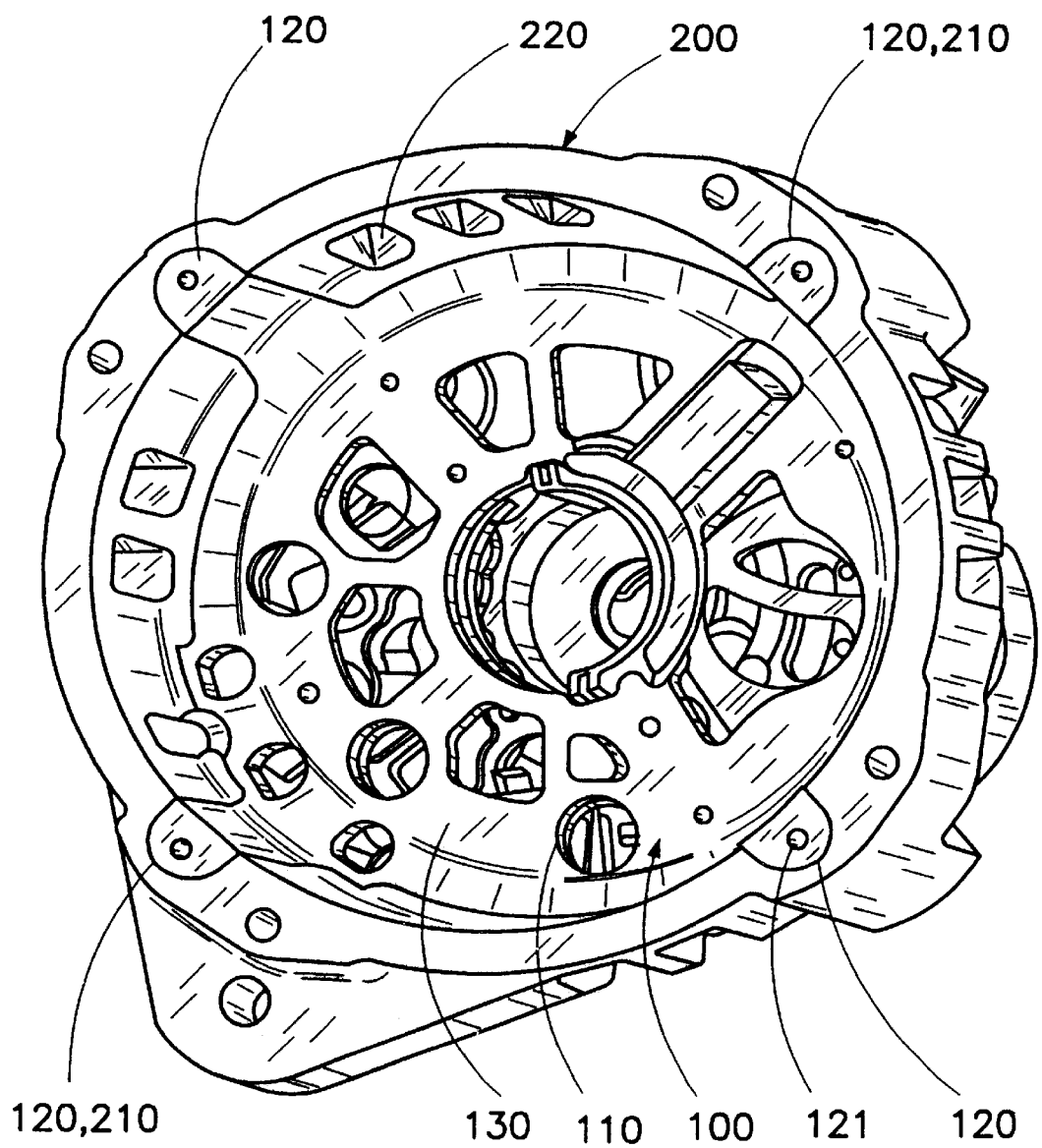
FIG. 4 is a perspective view illustrating a state that a heat sink is inserted into a rear bracket according to the present invention.
Figure 5:
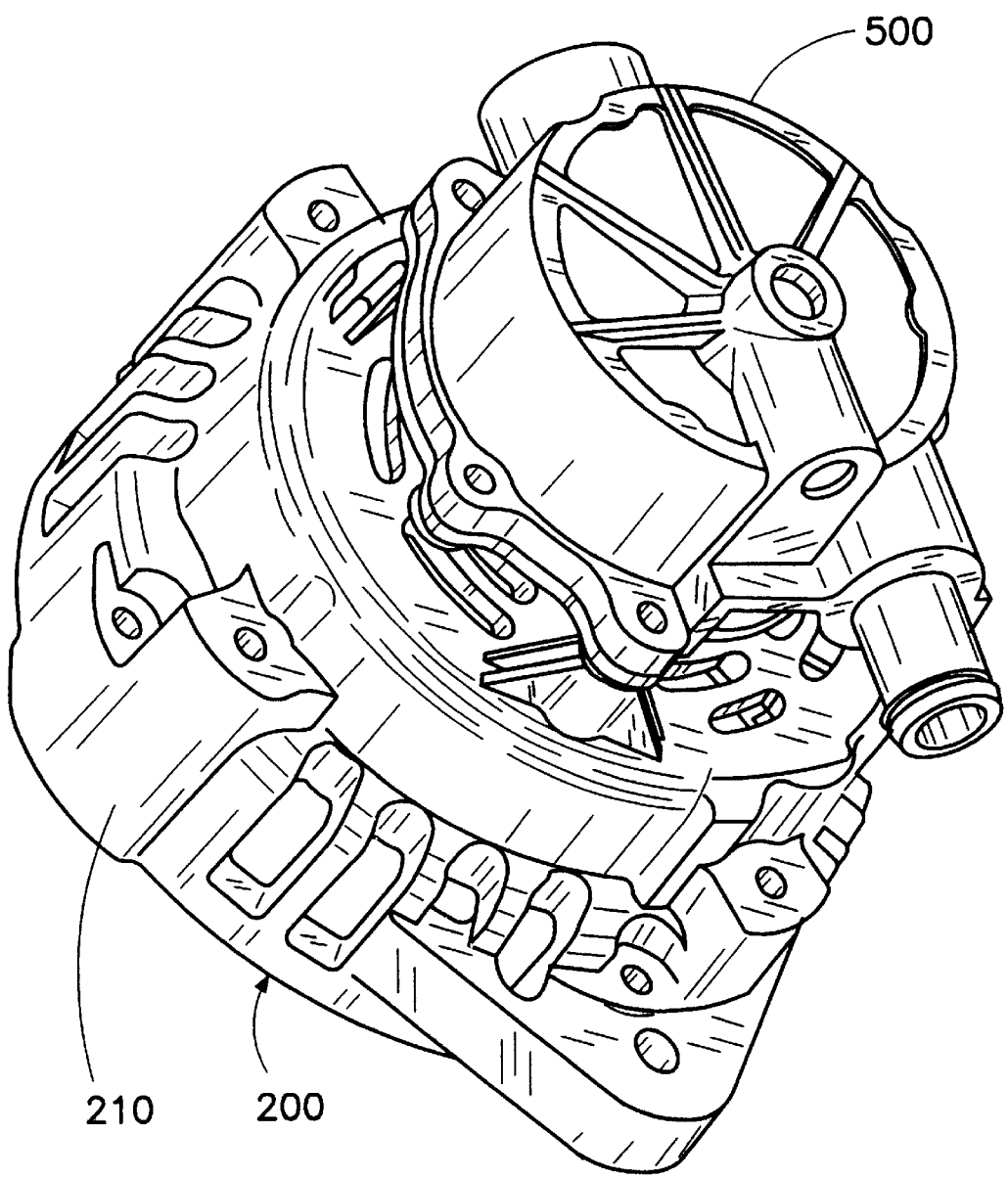
FIG. 5 is a perspective view illustrating a state that a vacuum pump is installed in the state of FIG. 4 according to the present invention.
Figure 6:
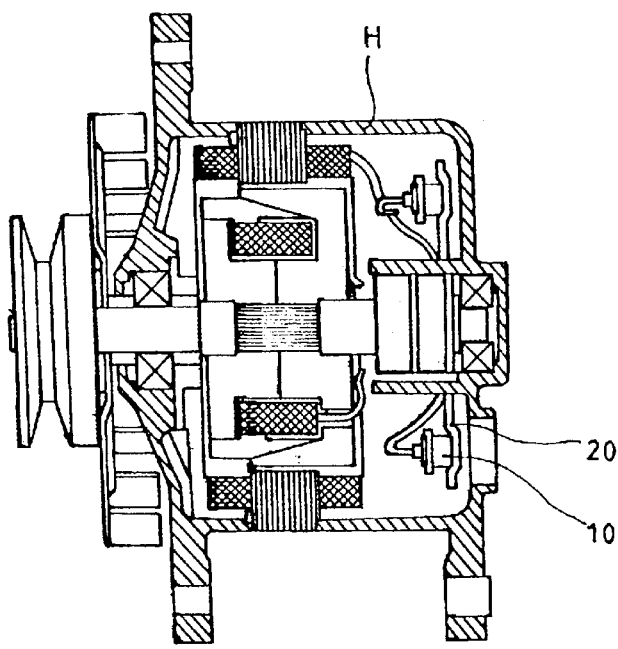
FIG. 6 is a cross-sectional view illustrating a conventional alternator for a vehicle.
Figure 7:
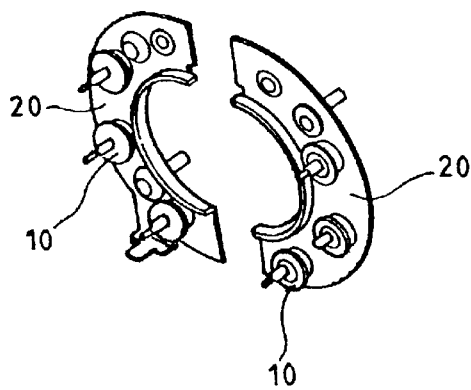
FIG. 7 is a perspective view illustrating a state that a diode is installed in a conventional heat sink.

FIG. 1 is a perspective view illustrating a heat sink plate of an alternator for a vehicle according to the present invention, FIG. 2 is a perspective view illustrating a state that an electrical device such as a regulator is installed in a heat sink plate according to the present invention, FIG. 3 is a perspective view illustrating a rear bracket in which a heat sink plate is installed according to the present invention, FIG. 4 is a perspective view illustrating a state that a heat sink is inserted into a rear bracket according to the present invention, and FIG. 5 is a perspective view illustrating a state that a vacuum pump is installed in the state of FIG. 4 according to the present invention.

In a heat sink plate 100 of the present invention, a circular plate 130 is formed based on a die casting method, and a hole 110 in which a diode 10 is installed is formed, is formed in the circular plate 130. In addition, a protrusion 120 is mounted in a heat sink protrusion mounting groove 210 formed in a certain portion of a rear bracket 200 in a circumferential surface of the circular plate 130 for thereby enhancing a performance of a fan by implementing an effective heat transfer.

The number of the holes 110 formed in the circular plate 130 of the heat sink plate 100 is determined based on the number of the diodes 10.

An electrical device such as a regulator 300 and a connector 400 are attached in a direction opposed to the direction that the protrusion 120 of the circular plate 130 is formed.

A through hole 121 is formed in the protrusion 120 and is engaged with the rear bracket 200.

The protrusion 120 is formed by a length determined based on the length of the rear bracket 200 of the alternator.

The rear bracket 200 incoudes a circular plate mounting portion 220 in which the circular plate 130 of the heat sink plate 100 is mounted, and a connector mounting groove 230 for mounting the connector 400 therein.

A vacuum pump 500 is installed in a portion opposed to the portion that the circular plate mounting portion 220 of the rear bracket 200 is formed for thereby being rotated together with a rotary shaft(not shown).

In the drawing, reference numeral 211 represents an engaging hole which communicates with a hole 121 formed in the protrusion 120 and into which an engaging member (not shown) is engaged.

Therefore, the heat sink plate 100 of the alternator is integrally formed with the circular plates 130 and the protrusion 120 in a die casting method for thereby simply assembling to the rear bracket 200. The diode 10 installed in the circular plate 130 of the heat sink plate 100 radiates the heat generated by the rectifying operation to the rear bracket 200 through the circular plate 130 of the heat sink plate 100 and the protrusion 120.

At this time, the protrusion 120 is capable of implementing a smooth flow of the fluid inputted by the fan for thereby obtaining an excellent cooling performance.

In addition, the heat sink plate 100 is formed of a single part and is installed in the rear bracket 200 for thereby implementing an easier assembling operation.

In the heat sink plate 100 in which the electrical device such as the regulator 300 is installed in one side of the same, the protrusion 120 is integrally installed and is mounted in the heat sink protrusion mounting groove 210 of the rear bracket 200, so that it is possible to significantly increase the productivity.

As described above, the heat sink plate of an alternator for a vehicle according to the present invention is capable of implementing an inherent operation of the heat sink, enhancing a performance of the fan and a simple assembling operation and obtaining a stable installation of the regulator and other elements.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a heat sink of an alternator for a vehicle, said heat sink including at least one diode for changing an alternating current to a direct current thereby said at least one diode radiating heat, said heat sink having a die-casting circular heat sink plate, at least one hole being formed at a predetermined portion of the circular heat sink plate for accommodating the at leas one diode, and said heat sink further having at least one protrusion, wherein said at least one protrusion is inserted into a heat sink protrusion mounting groove of a rear bracket in a predetermined circumferential surface of the circular heat sink plate for engaging the heat sink with the rear bracket.

2. A heat sink plate of an alternator for a vehicle of claim 1, wherein said at least one diode comprises a number of diodes, said at least one hole comprises a number of holes, and the number of said holes is determined based on the number of the diodes.

* * * * *